# United States Patent Office 3,317,330
Patented May 2, 1967

3,317,330
METHOD OF TREATING POLYETHYLENE AND POLYPROPYLENE PLASTIC SURFACES
Sidney Livingston, Beechhurst, and Leonard Mackles, New York, N.Y., assignors to Chemclean Corporation, Queens, N.Y., a corporation of Delaware
No Drawing. Filed Jan. 5, 1965, Ser. No. 423,584
6 Claims. (Cl. 106—287)

The present application is a continuation-in-part of my previously filed patent application entitled, Method for Treating Polyethylene and Polypropylene, filed May 1, 1961, and assigned Ser. No. 106,522, now abandoned.

This invention relates to a method for changing the normally hydrophobic surfaces of polyethylene and polypropylene articles to hydrophylic surfaces.

The general object of the invention is to provide a novel, simple and reliable method as set forth above and for the particular purpose of preparing the surfaces of polyethylene and polypropylene articles for lacquering, bonding, printing and metallizing.

The surfaces of plastic articles made of polyethylene polypropylene are normally hydrophobic and therefore unreceptive to most lacquers, adhesives, printing inks, dyes and metals sought to be deposited from solutions of their salts or in vacuum volatilization and other materials sought to be applied to such surfaces.

According to the present invention the surfaces of articles of polyethylene and polypropylene may be readily oxidized and provided with a molecular film, thereby rendering said surfaces hydrophylic and receptive to lacquers, adhesives, printing inks, dyes, metals and other materials.

The method of the invention basically comprises immersing the normally inert surfaces of polyethylene or polypropylene for a few seconds in a bath having a preponderance of approximately 90% of a strong acid, such as sulphuric, and small amounts each of potassium permanganate, water, chromic acid (chromium trioxide), and a wetting agent having a perfluoroalkyl chain, detonated generally by the chemical formula $(C_nF_{2n+1})R$, where $n$ is an integer from 6 to 10 and R is selected from the group consisting of carboxylic acid, sulphonic acid, their salts and their derivatives, and thoroughly rinsing the surface with water and then drying it. The wetting agent utilized in the present method is one of those which is designated as a fluorochemical surfactant.

The polyethylene and polypropylene surfaces to be treated may be immersed in the bath for a period of from 15 to 30 seconds at room temperature (70° F.) for good results. As would be expected, the degree of change from a hydrophobic and unreceptive to a hydrophylic and receptive surface of the polyethylene or polypropylene article being treated varies with the strength of the bath, the temperature of the bath and the length of time of immersion.

A bath comprising concentrated sulfuric acid, water, potassium permanganate, chromic acid and a fluorochemical surfactant wetting agent, of the aforementioned type, is a strong oxidizing agent, which, when in contact with the organic matter presented by the polymers of ethylene or propylene, will permit the potassium permanganate to deposit an invisible predominantly manganous film on said polymer surfaces, thus enhancing the bonding characteristics thereof.

It will be obvious to those skilled in the art that the method of the present invention may be utilized as an additional series of steps in the continuous production of polyethylene or polypropylene articles having one or more hydrophylic surfaces, by the extrusion process or by any other suitable process.

It is further to be noted that only those surfaces of a polyethylene or polypropylene article desired to be renedered hydrophylic need be subjected to the present method.

The following are examples of the various baths which may be utilized to perform the method of the present invention. The percentage proportions illustrated hereinbelow are weight percentages of the individual components of the bath, and the examples described are dependent upon the amount of potassium permanganate and fluorochemical surfactant employed. More particularly, the examples illustrated herein are for a maximum, a minimum and an intermediate amount of potassium permanganate and fluorochemical surfactant.

It is again to be noted that all percentages recited are percentages by weight:

*Example I*

| | Percent |
|---|---|
| Sulphuric acid (66° Bé.) | 89.845 |
| Water | 8.00 |
| Chromic acid | 2.00 |
| Potassium permanganate | 0.13 |
| Fluorochemical surfactant | 0.025 |

*Example II*

| | Percent |
|---|---|
| Sulphuric acid (66° Bé.) | 89.945 |
| Water | 8.00 |
| Chromic acid | 2.00 |
| Potassium permanganate | 0.050 |
| Fluorochemical surfactant | 0.005 |

*Example III*

| | Percent |
|---|---|
| Sulphuric acid (66° Bé.) | 89.885 |
| Water | 8.00 |
| Chromic acid | 2.00 |
| Potassium permanganate | 0.10 |
| Fluorochemical surfactant | 0.015 |

It is to be noted that the bath set forth in Example III is the preferred embodiment and is presently employed in the treatment of normally hydrophobic polyethylene and polypropylene surfaces in order to render the same hydrophylic.

The bath is prepared in the following manner. The sulphuric acid is poured into a lead-lined vessel at standard temperature and pressure. The water is then poured into another container and weighed amounts of chromic acid (chromium trioxide) and potassium permanganate are added to the water to for ma homogeneous mixture. The homogeneous solution is then added slowly, and with constant mechanical agitation, to the tank containing the sulphuric acid, and at this time the wetting agent, fluorochemical surfactant, is added to the bath. However, it is to be noted that the wetting agent may be added directly to the water or may be added to the bath at any other point during the preparation thereof, as this is not a critical factor. This is performed in a slow and accurate manner in that a vast amount of heat is generated in blending sulphuric acid (66 Bé.) with water.

It is to be noted that the fluorochemical wetting agent is an important component of the bath solution in that it reduces the surface tension of the bath, permitting said bath to more completely contact the hydrophobic surfaces of the polyethylene and polypropylene plastic articles, thereby rendering said surfaces more susceptible to oxidation thereof and to the deposition of the invisible predominantly manganous film thereon by the potassium permanganate. This results in a more uniform and more effective film, which is predominantly manganous, being deposited on the surfaces of the polyethylene and polypropylene articles to cause said surfaces to become highly hydrophylic.

While I have shown and described the preferred embodiment of my invention, there are many modifications which may be made therein by persons skilled in the art without departing from the spirit and scope of the invention as defined by the appended claims.

What is claimed is:

1. The method of treating polyethylene and polypropylene articles to render the normally hydrophobic surfaces thereof hydrophylic, which method consists in immersing said surfaces for a few seconds in a bath, wherein the percentages by weight are as follows, 8.00% water, 2.00% chromic acid, 0.13% potassium permanganate, 0.025% of a fluorochemical surfactant of the general formula $(C_nF_{2n+1})R$, where $n$ is an integer from 6 to 10 and R is selected from the group consisting of carboxylic acids, sulphonic acids, their salts and their derivatives, and 89.845% concentrated sulphuric acid; and then rinsing said surfaces with water and drying them.

2. The method of treating polyethylene and polypropylene articles to render the normally hydrophobic surfaces thereof hydrophylic, which method consists in immersing said surfaces for a few seconds in a bath, wherein the percentages by weight are as follows, 8.00% water, 2.00% chromic acid, 0.050% potassium permanganate, 0.005% of a fluorochemical surfactant of the general formula $(C_nF_{2n+1})R$, where $n$ is an integer from 6 to 10 and R is selected from the group consisting of carboxylic acids, sulphonic acids, their salts and their derivatives, and 89.945 concentrated sulphuric acid; and then rinsing said surfaces with water and drying them.

3. The method of treating polyethylene and polypropylene articles to render the normally hydrophobic surfaces thereof hydrophylic, which method consists in immersing said surfaces for a few seconds in a bath, wherein the percentages by weight are as follows, 8.00% water, 2.00% chromic acid, 0.10% potassium permanganate, of 0.015 of a fluorochemical surfactant of the general formula $(C_nF_{2n+1})R$, where $n$ is an integer from 6 to 10 and R is selected from the group consisting of carboxylic acids, sulphonic acids, their salts and their derivatives, and 89.885% concentrated sulphuric acid; and then rinsing said surfaces with water and drying them.

4. A solution for rendering the normally hydrophobic surfaces of polyethylene and polypropylene articles hydrophylic, said solution comprising, by weight, 8.00% water, 2.00% chromic acid, and potassium permanganate, concentrated sulphuric acid and a wetting agent, whose amounts may vary as follows, respectively;

| | Percent |
|---|---|
| Potassium permanganate | 0.050–0.013 |
| Concentrated sulphuric acid | 89.945–89.845 |
| Fluorochemical surfactant of the general formula $(C_nF_{2n+1})R$, where $n$ is an integer from 6 to 10 and R is selected from the group consisting of carboxylic acids, sulphonic acids, their salts and their derivatives | 0.005–0.025 |

5. A solution for rendering the normally hydrophobic surfaces of polyethylene and polypropylene articles hydrophylic, said solution comprising, by weight a 10.00% chromic acid and water admixture and potassium permanganate, concentrated sulphuric acid and a wetting agent wherein these amounts may vary as follows, respectively:

| | Percent |
|---|---|
| Potassium permanganate | 0.050–0.013 |
| Concentrated sulphuric acid | 89.945–89.845 |
| Fluorochemical surfactant of the general formula $(C_nF_{2n+1})R$, where $n$ is an integer from 6 to 10 and R is selected from the group consisting of carboxylic acids, sulphonic acids, their salts and their derivatives | 0.005–0.025 |

6. A solution for rendering the normally hydrophobic surfaces of polyethylene and polypropylene articles hydrophylic, said solution comprising by weight, approximately 90% concentrated sulphuric acid and approximately 10% chromic acid, water, potassium permanganate and a fluorochemical surfactant of the general formula $(C_nF_{2n+1})R$, where $n$ is an integer from 6 to 10 and R is selected from the group consisting of carboxylic acids, sulphonic acids, their salts and their derivatives.

References Cited by the Examiner

UNITED STATES PATENTS

| Re. 24,062 | 9/1955 | Horton | 260—94.9 |
| 2,461,966 | 2/1949 | Davis | 260—94.9 |
| 2,979,422 | 4/1961 | Bersin | 117—138.8 |
| 3,169,865 | 2/1965 | Wood | 117—138.8 |
| 3,188,258 | 6/1965 | Young | 117—138.8 |
| 3,222,191 | 12/1965 | Steiner | 117—138.8 |

ALEXANDER H. BRODMERKEL, *Primary Examiner.*

D. J. ARNOLD, *Assistant Examiner.*

UNITED STATES PATENT OFFICE
CERTIFICATE OF CORRECTION

Patent No. 3,317,330                      May 2, 1967

Sidney Livingston et al.

It is hereby certified that error appears in the above numbered patent requiring correction and that the said Letters Patent should read as corrected below.

Column 2, line 3, for "renedered" read -- rendered --; line 51, for "for ma" read -- form a --; column 3, line 27, for "surfacant" read -- surfactant --; line 31, for "89.945" read -- 89.945% --; line 39, for "of 0.015 of" read -- 0.015% of --.

Signed and sealed this 11th day of June 1968.

(SEAL)
Attest:

Edward M. Fletcher, Jr.
Attesting Officer

EDWARD J. BRENNER
Commissioner of Patents